United States Patent Office 2,754,232
Patented July 10, 1956

2,754,232

MANUFACTURE OF MODIFIED STARCHES

Harland L. Wetzstein, Lake View, Iowa, and Priscilla Lyon, Chicago, Ill., assignors to American Maize-Products Company, a corporation of Maine No Drawing. Application October 15, 1952,
Serial No. 314,968

3 Claims. (Cl. 127—33)

This invention relates to an improvement in the method of manufacturing modified starch which gives uniform batches of starch with the desired degree of modification.

United States Patent No. 2,328,537, issued on September 7, 1943, to Felton and Schopmeyer describes the type of process to which this invention relates. In that process, starch in aqueous suspension, preferably at a pH of slightly above 6, is modified by heating it with a reactive chloride such as phosphorus oxychloride. The starch is then dried and pulverized for use. In this treatment the chloride apparently forms a shell or coating on the starch granules so that the tendency for them to swell and burst after prolonged cooking is reduced.

Although this process has proved to be of great commercial value, in practice it has been difficult to control the reaction and produce starch which consistently has the desired degree of modification. This has been true even with careful control of the usual variables such as time, temperatures and the amount of reactants. As a result, the batches of starch are not always uniform.

We have now discovered that we can produce uniform batches of starch with the Felton and Schopmeyer process by reacting the phosphorus oxychloride and starch in the presence of a small amount of a substantially neutral water-soluble metal salt. When this is done any desired degree of modification may be obtained consistently and the extent of modification is much greater than in the Felton and Schopmeyer process. For some reason we cannot now explain, the neutral salt apparently affects the reaction and it may well be that its presence prevents hydrolysis of the reactive chloride so that none of it is lost to side reactions. Those neutral salts having bivalent cations are more effective promoters than those with monovalent cations and it is possible that the bivalent cations so condition the starch granule that it takes up the reactive chloride more readily.

By the term substantially neutral, water-soluble salt we mean those salts of the alkali metals and alkali earth metals which hydrolyze to give substantially neutral aqueous solutions. Examples of such salts which we have used with particularly good results are the nitrates, sulfates and halides of sodium, potassium, calcium and barium. Magnesium chloride is effective but salts forming aqueous solutions of greater acidity than that of magnesium chloride are inoperative. The amount of neutral salt used for controlling the starch modification may be varied within wide ranges. In general, increasing amounts up to 2% by weight based on the dry weight of starch in aqueous suspension produces much greater changes in modification than increasing amounts in the higher percent ranges. More than 10% of the neutral salt may be employed but any substantial excess over this amount is just a waste, and we therefore recommend the top limit of 10%. In any case, the total amount of salt used in our process gives an accurate indication of the extent of starch modification.

The words "reactive chloride" are meant to include those chlorides which will react with starch suspended in an alkali medium and modify the granules as described in the Felton and Schopmeyer process. Of the various chlorides, phosphorus oxychloride, phosphorus pentachloride and epichlorohydrin are the most satisfactory. The conditions under which the reaction is carried out such as temperature, time of contact and pH remain the same as in the known commercial processes and they apparently have no effect on the extent of starch modification, although careful control of these factors will aid somewhat in speeding up the reaction. The type of starch used is not critical and good results have been achieved with the known starches.

In carrying out our invention, the substantially neutral water-soluble salt may be added at any stage in existing commercial processes as long as it is present at the time the reactive chloride is added to the aqueous suspension of starch. The form in which the salt is added is unimportant and it may be added in solution or in crystalline form, or it may be formed in situ.

For the purpose of illustration and in order to point out the best method now known to us of carrying out our invention, the following examples are given.

*Example 1*

1000 grams dry weight amioca starch were slurried in 1500 cc. water and the pH of the slurry was adjusted to a value of approximately 11 by the addition of sodium hydroxide solution. This usually requires 0.7% sodium hydroxide based upon starch solids in the suspension. 0.1% of NaCl based on the dry weight of starch was added and then 0.15% $POCl_3$ was slowly stirred into the solution at room temperature. The mixture was agitated for exactly one-half hour and the $POCl_3$ starch reaction killed by acidifying the mixture was a 2% solution of HCl to establish a pH of 5. The modified starch was then filtered, re-suspended twice in 2 liters of distilled water, filtered and dried in an oven at about 50° C. overnight. A 6% slurry of the dried sample in water was pasted on a Corn Industry's viscosimeter and the viscosity of the slurry at the end of 30 minutes was recorded as 550 gm. cm. A blank sample without NaCl treated as described above gave a viscosity of 650 gm. cm.

The method of Example 1 was repeated as follows:

| $POCl_3$, Percent | Salt | Percent | 30 Minute Viscosity, gm. cm. |
|---|---|---|---|
| 0.15 | NaCl | 0.4 | 375 |
| 0.15 | NaCl | 0.7 | 225 |
| 0.15 | | | 700 |
| 0.15 | NaCl | 5.0 | 51 |
| 0.15 | NaCl | 10.0 | 5 |
| 0.30 | | | 848 |
| 0.30 | NaCl | 1.0 | 525 |
| 0.30 | NaCl | 2.5 | 430 |
| 0.60 | | | 636 |
| 0.60 | NaCl | 1.0 | 165 |
| 0.60 | NaCl | 2.50 | 60 |
| 0.90 | | | 500 |
| 0.90 | NaCl | 1.0 | 55 |
| 0.90 | NaCl | 2.5 | 0 |

An examination of the data set forth in the example shows that as the amount of neutral salt is increased for a given amount of reactive chloride, the viscosity of starch slurries made with the modified starch product increases and this shows that the degree of modification of starch grains increases with increasing amounts of neutral salt for the same amount of reactive chloride. Once the extent of modification for different levels of neutral salt is determined for a given amount of reactive chloride the desired degree of modification may be obtained consistently merely by adding a controlled amount of neutral salt to the reaction mixture.

The method of Example 1 was repeated comparing the effect of sodium chloride to that of various other neutral salts as follows:

| POCl₃, Percent | Salt | Percent | 30 Minute Viscosity, gm. cm. |
|---|---|---|---|
| 0.15 | NaCl | 0.25 | 315 |
| 0.15 | NaBr | 0.25 | 396 |
| 0.15 | Na₂SO₄ | 0.25 | 398 |
| 0.15 | NaNO₃ | 0.25 | 470 |
| 0.15 | NaI | 0.25 | 476 |
| 0.15 | KCl | 0.25 | 368 |
| 0.15 | KBr | 0.25 | 445 |
| 0.15 | KNO₃ | 0.25 | 450 |
| 0.15 | KI | 0.25 | 548 |
| 0.15 | CaCl₂ | 0.25 | 47 |
| 0.15 | CaSO₄ | 0.25 | 94 |
| 0.15 | Ca(NO₃)₂ | 0.25 | 224 |
| 0.15 | SrCl₂ | 0.25 | 114 |
| 0.15 | Sr(NO₃)₂ | 0.25 | 422 |
| 0.15 | BaCl₂ | 0.25 | 144 |
| 0.15 | Ba(NO₃)₂ | 0.25 | 376 |

The method of Example 1 was repeated but the starch was modified with antimony pentachloride and epichlorohydrin in place of the phosphorus pentachloride of Example 1.

| SbCl₅ Percent | Salt | Percent | 30 Minute Viscosity, gm. cm. |
|---|---|---|---|
| 0.15 | NaCl | 0.25 | 1,000 |
| 0.15 | | | 0 |

| C₃H₅OCl Percent | Salt | Percent | 30 Minute Viscosity, gm. cm. |
|---|---|---|---|
| 0.06 | NaCl | 2.5 | 976 |
| 0.06 | | | 888 |

In the case of epichlorohydrin the reaction mixture was stirred for 16 hours at room temperature. Otherwise the method was the same as that specified in Example 1.

It will be understood that the examples are merely intended to give specific illustrations of the way our invention can be carried out and are not intended to imply any limitations on the variations that may be employed.

What we claim is:

1. In carrying out a reaction of the type which comprises forming an aqueous suspension of starch in undissolved condition, establishing the pH of the mixture between about 7 to about 12 so that the alkalinity causes reactivity without pasting the starch, adding a minor proportion of a chloride selected from the group consisting of phosphorus oxychloride, phosphorus pentachloride, thio phosphoryl chloride, antimony pentachloride, antimony oxychloride and epichlorohydrin, maintaining contact between the said starch and chloride until reaction between the starch and chloride is effected, then making the mixture acidic, and filtering out the starch product appearing as solid material in the mixture, the method of controlling the said reaction which comprises adding a substantially neutral water soluble metal salt to the reaction mixture so that the reaction between the chloride and starch will take place in the presence of such added neutral salt, said neutral salt being selected from the group consisting of alkali metal and alkali earth metal salts which hydrolyze to give substantially neutral aqueous solutions, said neutral salt being added in the proportion of up to about 10% by weight of the amount of dry starch solids in the said reaction mixture and the amount of said neutral salt being that which will give the desired degree of modification for the amount of chloride employed in the reaction mixture.

2. The method of claim 1 in which the substantially neutral water-soluble salt is selected from the group consisting of the nitrates, sulfates and halides of sodium, potassium, calcium and barium.

3. The method of claim 1 in which the neutral salt is about 0.1% to 10% by weight of the amount of dry starch solids used in the process.

References Cited in the file of this patent

UNITED STATES PATENTS 2,328,537    Felton et al. _____ Sept. 7, 1943

OTHER REFERENCES

Kerb: "Über eine Verbindung der Stärke mit Phosphorsäure." Biochemische Zeitschrift, Berlin, 1919, Bd. 100, pages 3–14. Through: Walton, "Starch Chemistry," vol. 1, 1928, Chemical Catalog Co., New York, page 108 (in second half of book).

Radley: "Starch and Its Derivatives." Van Nostrand, New York, 1944, page 51.